United States Patent
Zappala

(10) Patent No.: US 6,374,094 B1
(45) Date of Patent: Apr. 16, 2002

(54) RF FILTER ARCHITECTURE SUPPORTING SIMULTANEOUS FILTERED RECEPTION OF A AND B BANDS OF THE CELLULAR RADIO FREQUENCY SPECTRUM

(75) Inventor: Christopher F. Zappala, Hunterdon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/426,858

(22) Filed: Oct. 26, 1999

(51) Int. Cl.7 .................................................. H04B 1/06
(52) U.S. Cl. ..................... 455/188.1; 455/280; 455/307; 455/80
(58) Field of Search ........................... 455/188.1, 180.1, 455/191.1, 191.3, 266, 307, 78, 80, 82, 83, 280, 282, 283, 290; 333/1.1, 101, 102

(56) References Cited

U.S. PATENT DOCUMENTS 5,276,914 A * 1/1994 Ishizuka et al. ............ 455/280
6,108,313 A * 8/2000 Lee et al. ...................... 455/78

* cited by examiner

Primary Examiner—Thanh Cong Le
(74) Attorney, Agent, or Firm—Birch Stewart Kolasch & Birch LLP

(57) ABSTRACT

An RF filter for a cellular radio receiver whose architecture includes a combination of signal circulators and bandpass filters which operate to selectively notch out sub-bands of the two cellular bands of the cellular radio transmission spectrum so that the sub-bands of both cellular bands can be separately directed to a radio capable of receiving either or both the A or B-band signals. In its preferred form, the architecture of the filter includes two circulators, three bandpass filters having mutually different bandpass characteristics, covering selected portions of the A and B band and a diplexor.

15 Claims, 2 Drawing Sheets

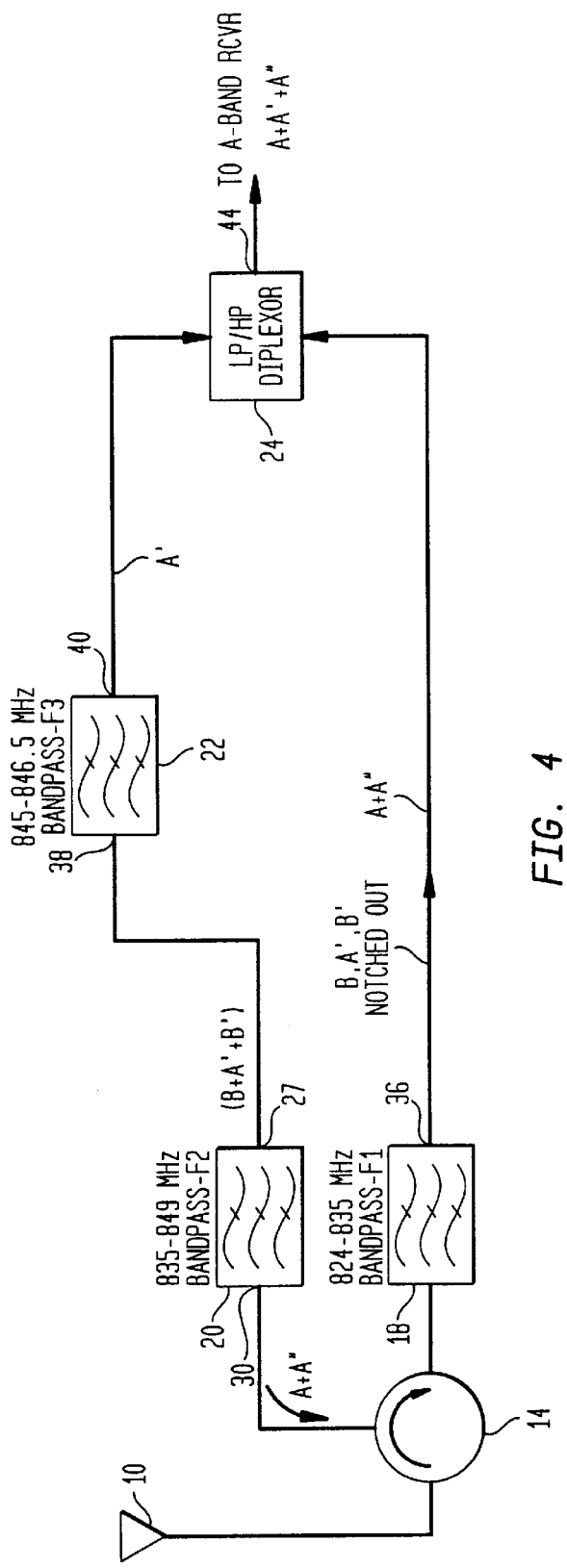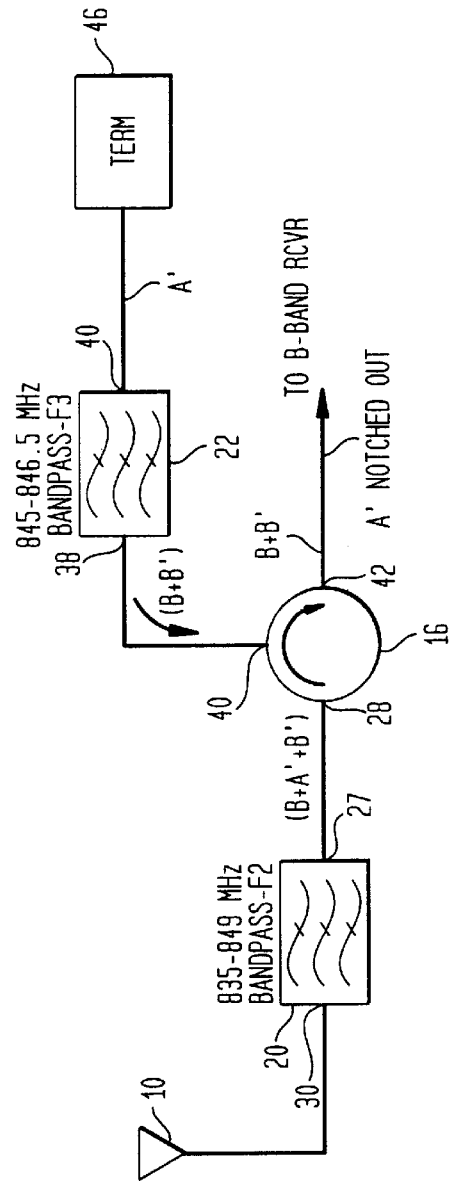

RF FILTER ARCHITECTURE SUPPORTING SIMULTANEOUS FILTERED RECEPTION OF A AND B BANDS OF THE CELLULAR RADIO FREQUENCY SPECTRUM

BACKGROUND OF THE INVENTION

1. Field of the Invention

This invention relates generally to cellular radio communication systems and, more particularly, to an RF filter architecture for receiving signals in the two cellular bands allocated for cellular radio transmission.

2. Description of Related Art

Recent agreements between service providers of cellular radio communications involve the desire to receive signals in a competitor's designated frequency band in order to improve network performance. Specifically, one service provider would measure a mobile's signal strength and determine the identification for a mobile which is not in the provider's band, but may be on a cell boundary. If the mobile is at a cell boundary, a sector-to-sector or cell-to-cell handoff would become necessary. Since the mobile may be handed off to the service provider's base station, this verification is necessary in determining if enough receive signal is present to allow adequate link performance.

The prior art regarding such a scenario would be to install two separate and distinct base station receiver front ends, one for each of the two allocated bands, A and B, to allow a "cross-band locate" functionality.

SUMMARY

Accordingly, it is an object of the invention to provide an improvement in cellular radio receiver apparatus.

It is another object of the invention to provide a front-end architecture which supports simultaneous filtered reception of both cellular bands with a common set of receiver hardware.

It is still a further object of the invention to provide cellular radio receiver apparatus including filter architecture for supporting reception of cellular A and B bands of the cellular radio frequency spectrum.

The foregoing and other objects of the invention are achieved by a combination of signal circulators and bandpass filters which operate to selectively notch out sub-bands of the two cellular bands of the cellular radio transmission spectrum so that the sub-bands of both cellular bands can be directed to a radio capable of receiving either the A or B-band signals.

In its preferred embodiment, the invention is directed to an RF filter architecture in a cellular radio receiver for supporting two different cellular receive bands of the spectrum for cellular radio communications where each band includes at least two sub-bands, comprising: a first RF signal circulator having a plurality of signal ports including an input port for receiving an RF input signal and at least two output ports; a first bandpass filter having a first frequency bandpass characteristic and having a pair of signal ports including an input port and an output port, said input port being coupled to one of the two output ports of the first circulator; a second bandpass filter having a second frequency bandpass characteristic different from the first bandpass characteristic and having a pair of signal ports including an input port and an output port, the input port thereof being coupled to the other output port of the two output ports of the first circulator, the output port of the second bandpass filter providing a first output signal corresponding to one or more sub-bands of the two cellular receive bands, wherein said first circulator and said first bandpass filter operate to notch out frequencies within the first bandpass characteristic from the first output signal; a second RF signal circulator having a plurality of signal ports including an input port coupled to the output port of the first bandpass filter and at least two output ports, one of the output ports of the second circulator providing a second output signal corresponding to one or more sub-bands of the two cellular receive bands; and, a third bandpass filter having a third bandpass frequency characteristic different from the first and second bandpass characteristic and having a pair of signal ports including an input port and an output port, the input port thereof being coupled to the other of the output ports of the second RF circulator, the output port of the third bandpass filter providing a third output signal corresponding to one or more sub-bands of the two cellular receive bands, and wherein the second circulator and the third bandpass filter operate to notch out frequencies within the third bandpass characteristic from the second output signal and wherein the first and third output signals include the sub-bands of a first band of the two cellular receive bands such as the A-band and the second output signal includes sub-bands of a second band of the two cellular receive bands such as the B-band.

Further scope of applicability of the present invention will become apparent from the detailed description provided hereinafter. It should be understood, however, that the detailed description and specific examples, while providing the preferred embodiments of the invention, are provided by way of illustration only, since changes and modifications coming within the spirit and scope of the invention will become apparent to those skilled in the art from the detailed description.

BRIEF DESCRIPTION OF THE DRAWINGS

The present invention will become more fully understood when the detailed description provided hereinafter is considered in conjunction with the accompanying drawings which are presented by way of illustration only, and thus are not meant to be limitative of the present invention, and wherein:

FIG. 3 is an electrical block diagram illustrative of a base station receiver for exclusively receiving the A-band of cellular radio frequencies; and FIG. 4 is an electrical block diagram illustrative of a front end for a base station receiver for exclusively receiving B-band cellular radio frequencies.

DETAILED DESCRIPTION OF THE INVENTION

Figure 1:
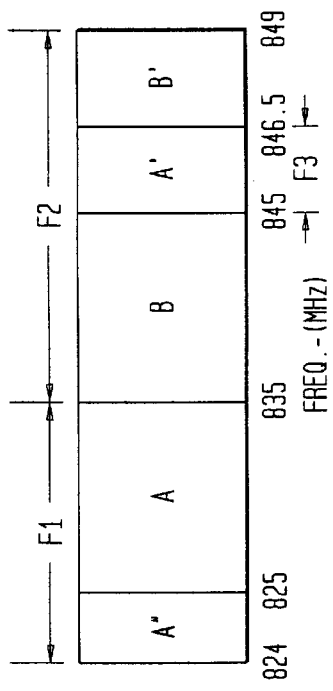
FIG. 1 is illustrative of the frequency spectrum for cellular radio communications.

The spectrum for cellular radio communications transmission and reception, as mandated by the Federal Communication System (FCC) is broken up into several non-contiguous frequency bands shown in FIG. 1 comprising the bands A and B. In a typical base station environment, two service providers operate their wireless service at the same time, but either in the A-band or the B-band. The full A-band consists of three non-equal sub-bands denoted A, A' and A". The A and A" sub-bands are contiguous, meaning that the upper edge of the A" sub-band extending from 824 MHz to 825 MHz runs into the lower edge of the A sub-band which extends from 825 MHz to 835 MHz. The A' sub-band, however, and extending from 845 MHz to 846.5 MHz is separated in frequency from the A and A" sub-bands by one sub-band of the B-band which extends from 835 MHz to 845 MHz. The full B-band includes a second sub-band B' which extends from the upper edge of the A' sub-band at 846.5 MHz to 849 MHz. The sub-bands B and B' are also non-contiguous, meaning that the B sub-band and the B' sub-band are separated in frequency by the A' sub-band.

To overcome this dilemma, a A-band or B-band wireless service provider typically uses a notch filter in the base station front end in order to attenuate the received signals from a competitor's mobiles. For example, a A-band service provider employs a receiver front-end which utilizes a notch filter which attenuates the B-band signals and passes the A-band, A' and A" signals. Likewise, a B-band service provider employs a different receiver front-end which utilizes an RF notch filter which attenuates the A-band signals and passes the B and B' signals. Typically, each receiver front-end employs an entirely different filtering architecture optimized for either the full A-band reception or the full B-band reception, but not both.

This now leads to a consideration of three embodiments of the subject invention which employ a combination of bandpass filters and at least one RF signal circulator to notch out certain sub-bands of the A and B-band spectrum, so as to fully output the sub-bands of either the A-band or B-band or both for use by a base station receiver.

Figure 2:
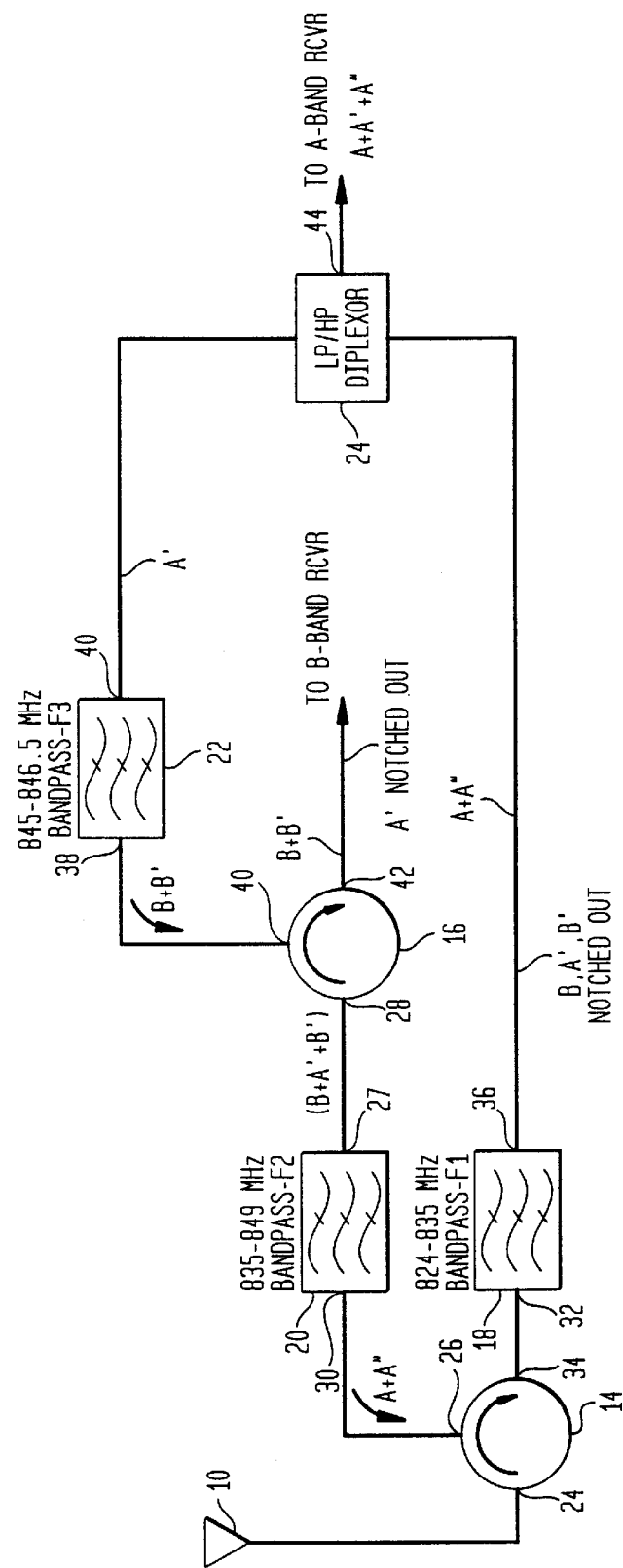
FIG. 2 is an electrical block diagram illustrative of a common front-end of a base station receiver providing cross-band locate functionality.

The preferred embodiment of the subject invention is shown in FIG. 2 and discloses a common receiver front-end for a base station receiver which permits "cross-band locate" functionality, while minimizing hardware and needing but one antenna. The hardware includes, in addition to an antenna 10, a pair of RF signal circulators 14 and 16 and three bandpass filters 18, 20 and 22, and a low pass/high pass diplexor 24. The three bandpass filters 18, 20 and 22 have mutually different bandpass characteristics. For example, bandpass filter 18 has a frequency bandpass characteristic F1 which extends from about 824 MHz to about 835 MHz, bandpass filter 20 has a frequency bandpass characteristic F2 which extends from about 835 MHz to about 849 MHz, while bandpass filter 22 has a bandpass characteristic F3 which extends from about 845 MHz to about 846.5 MHz.

In operation, signals from mobile units associated with both the A-band the B-band are present at the antenna 10. These signals are coupled to one circulator port 24, which acts as an input port and are directed to bandpass filter 20 via circulator port 26. Signals within the bandpass F2 which contains signals from sub-bands B, A' and B' are passed to one port 28 of the second circulator 16 which also acts as an input port. Signal frequencies outside of the bandpass F2, namely sub-bands A and A' are reflected off of the input port 30 of bandpass filter 20 back toward the first circulator 14 where they enter the port 26 where they are directed to the input port 32 of bandpass filter 18 via circulator port 34. Since the bandpass of bandpass filter 18 is F1, sub-band signals A and A" appear at output port 36. The effect of the circulator 14 and the bandpass filter 20 arrangement is to notch out sub-bands B, A' and B' in the output of the bandpass filter 18, while outputting sub-bands A and A".

The second circulator 16 performs a similar function. The sub-band frequencies B, A' and B' are fed to the input port 38 of bandpass filter 22 via circulator port 40. Since bandpass filter 24 has a bandpass characteristic F3, frequencies in sub-band A' are provided at the output port 40. Signals outside the bandpass F3 of bandpass filter 22, namely sub-bands B and B', are reflected from the bandpass filter 22 to circulator port 40, where they exit circulator port 42. The sub-band signals B and B' are inclusive of the B-band frequencies, with the intermediate A' sub-band notched out. Accordingly, the output port 42 provides the sub-bands B and B' which can then be directed to a radio which is capable of receiving B-band signals. The effect of the circulators 14 and 16 is to remove the A, A' and A" sub-bands from this point in the circuit, namely at the output port 42 of circulator 16.

At the same time, the output of the bandpass filter 18 containing the A and A" signals is diplexed with the output of the bandpass filter 22 to provide the full A-band frequencies including the sub-bands A, A' and A" with the B-band notched out. The output port 44 of the diplexer 24 can be connected to a radio receiver capable of receiving A-band signals. When desirable, one could combine the outputs of ports 42 and 44 to product a single composite output of prefiltered A and B-band signals.

The same principles described with respect to the embodiment shown in FIG. 2 can be employed to generate either A-band or B-band outputs exclusively. For example, the embodiment shown in FIG. 3 is adapted to output only A-band signals, while the embodiment shown in FIG. 4 is adapted to output only B-band signals.

Referring now to FIG. 3, the embodiment shown thereat eliminates the second circulator 16 of FIG. 2, and the output port 27 of bandpass filter 20 is fed directly to the input port 38 of bandpass filter 22. As before, the sub-bands B, A' and B' are notched out of the signals appearing at the output port 36 of bandpass filter 18, leaving sub-bands A and A" thereat. Since the bandpass characteristic F3 of bandpass filter 22 only passes A' sub-band signals from an input including B, A' and B' signals, output 40 provides only A' sub-band signals. Again, the diplexer 44 combines all three A-band sub-bands A, A' and A" at port 44.

Referring now to FIG. 4, this embodiment in effect eliminates the circulator 14 of FIG. 2 and the antenna 10 is now connected to input port 30 of bandpass filter 20. In such a configuration, the output port 27 of bandpass filter 20 provides sub-band signals B, A' and B' which are fed to the input port 28 of circulator 16. These signals are fed from circulator port 40 to the input port 38 of bandpass filter 22, which only passes A' sub-band signals. Accordingly, sub-band signals B and B' are reflected from the input of bandpass filter 22 back to circulator port 40 where they are output from circulator port 42, thus providing an output consisting only of B-band signal frequencies with the sub-band A' being notched out of the output to a B-band receiver. The A' sub-band signals which were fed through the bandpass signal 22 are coupled to a conventional signal termination 46.

The embodiment shown in FIG. 2 is particularly useful inasmuch as it provides a "cross-band locate" functionality which minimizes hardware and requires only a single antenna. It should be noted, however, that all three embodiments could possibly be implemented in a single circuit configuration using the components of FIG. 2 with suitable switching being utilized to reconfigure the elements on demand as shown in FIGS. 3 and 4.

Having thus shown and described what is at present considered to be the preferred embodiments of the invention, it should be noted that the same has been made by way of illustration and thus may be varied in other ways. Such variations are thus not to be regarded as a departure from the spirit and scope of the invention as set forth in the following claims.

What is claimed is:

1. An RF filter architecture in a cellular radio receiver for supporting at least one band of the cellular radio frequency spectrum, comprising:

at least one RF signal circulator having a plurality of signal ports including an input port and at least two output ports;

at least one bandpass filter coupled to said circulator, and having a predetermined frequency bandpass characteristic covering a portion of the cellular radio frequency spectrum and including a plurality of signal ports including an input port and an output port, said input port of the bandpass filter being coupled to one output port of said two output ports of said circulator;

wherein RF signals fed to the input port of said circulator and having a frequency outside the bandpass characteristic of said filter are reflected back from the input port of said filter to said one output port of said circulator and then to the second output port of said circulator.

2. An RF filter architecture according to claim 1 and further comprising a second bandpass filter including an input port and an output port having a predetermined frequency bandpass characteristic covering another portion of the cellular radio frequency spectrum, wherein an RF input signal from a receiving antenna is fed to the input port of the circulator, wherein said second output port of the circulator is coupled to the input port of the second bandpass filter, and wherein RF signals outside of the bandpass characteristic of said one bandpass filter are notched out of an output signal appearing at said output port of said second bandpass filter and comprise at least one sub-band of one receive band of the cellular radio frequency spectrum.

3. An RF filter architecture according to claim 2 wherein said at least one sub-band comprises a plurality of sub-bands of one receive band of the cellular radio frequency spectrum.

4. An RF filter architecture according to claim 2 and additionally including a third bandpass filter having a plurality of signal ports including an input port and an output port and having a predetermined bandpass characteristic covering still another portion of the cellular radio frequency spectrum, wherein the input port of said third bandpass filter is coupled to the output port of said second bandpass filter, and wherein an output signal appearing at the output port of said third bandpass filter comprises at least one other sub-band of said one receive band.

5. An RF filter architecture according to claim 4 wherein said sub-bands comprise sub-bands of the A band of the cellular radio frequency spectrum.

6. An RF filter architecture according to claim 4 wherein the frequency bandpass characteristic of said at least one bandpass filter includes the frequency range from about 835 MHz to about 849 MHz, the frequency bandpass characteristic of said second bandpass filter includes the frequency range from about 824 MHz to about 835 MHz and the frequency bandpass characteristic of said third bandpass filter includes the frequency range from about 845 MHz to about 846.5 MHz.

7. An RF filter architecture according to claim 1 and further comprising a second bandpass filter including an input port and an output port and having a predetermined frequency bandpass characteristic covering another portion of the cellular radio frequency spectrum and wherein an RF input signal from a receiving antenna is fed to the input port of said at least one bandpass filter and the output port thereof is coupled to the input port of said circulator, wherein said one output port of said circulator is coupled to the input port of said second bandpass filter, and wherein the output signal at said second output port of the circulator comprises at least one sub-band of one receive band of the cellular radio frequency spectrum.

8. An RF filter architecture according to claim 7 wherein said output signal includes two sub-bands of said one receive band.

9. An RF filter architecture according to claim 8 wherein said one band comprises the B-band of the cellular radio frequency spectrum.

10. An RF filter architecture according to claim 7 wherein the frequency bandpass characteristic of said at least one bandpass filter includes the frequency range from about 835 MHz to about 849 MHz and the frequency bandpass characteristic of said second bandpass filter includes the frequency range from about 845 MHz to about 846.5 MHz.

11. An RF filter architecture for supporting two different cellular receive bands of the spectrum of cellular radio communications and where each band includes at least two sub-bands, comprising:

a first RF signal circulator having a plurality of signal ports including an input port for receiving an RF input signal and at least two output ports;

a first bandpass filter having a first frequency bandpass characteristic and having a pair of signal ports including an input port and an output port, said input port being coupled to one of the two output ports of the first circulator;

a second bandpass filter having a second frequency bandpass characteristic different from said first bandpass characteristic and having a pair of signal ports including an input port and an output port, said input port thereof being coupled to the other output port of the two output ports of the first circulator, said output port of the second bandpass filter providing a first output signal corresponding to one or more sub-bands of said two cellular receive bands wherein said first circulator and said first bandpass filter operate to notch out frequencies within said first bandpass characteristic from said first output signal;

a second RF signal circulator having a plurality of signal ports including an input port coupled to the output port of the first bandpass filter and at least two output ports, one of said output ports of the second circulator providing a second output signal corresponding to one or more sub-bands of said two cellular receive bands; and;

a third bandpass filter having a third bandpass frequency characteristic different from said first and second bandpass characteristics and having a pair of signal ports including an input port and an output port, said input port thereof being coupled to the other of said output ports of the second RF circulator, said output port of the third bandpass filter providing a third output signal corresponding to one or more sub-bands of said two cellular receive bands, wherein said second circulator and said third bandpass filter operate to notch out frequencies within said third bandpass characteristic from said second output signal.

12. An RF filter architecture according to claim 11 wherein said first and third output signals include the sub-bands of a first band of said two cellular receive bands and said second output signal includes the sub-bands of a second band of said two cellular receive bands.

13. An RF filter architecture according to claim 12 wherein the first band of said two cellular receive bands includes three sub-bands and the second band of said two cellular receive bands includes two sub-bands.

14. An RF filter architecture according to claim 13 wherein the first band comprises the A-band of the spectrum for cellular radio communications, and the second band comprises the B-band of said spectrum.

15. An RF filter architecture according to claim 12 wherein the first bandpass frequency characteristic includes the frequency range from about 835 MHz to about 849 MHz, the second bandpass frequency characteristic includes the frequency range from about 824 MHz to about 835 MHz, and the third bandpass frequency characteristic includes the frequency range from about 845 MHz to 846.5 MHz.

* * * * *